Nov. 25, 1930.   F. E. TERMAN   1,782,588
ELECTRICAL MEASURING INSTRUMENT
Filed Feb. 13, 1928

Inventor
Frederick Emmons Terman
By Lyon & Lyon
Attorneys

Patented Nov. 25, 1930

1,782,588

UNITED STATES PATENT OFFICE

FREDERICK EMMONS TERMAN, OF STANFORD UNIVERSITY, CALIFORNIA

ELECTRICAL MEASURING INSTRUMENT

Application filed February 13, 1928. Serial No. 253,952.

This invention relates to an electrical measuring instrument and refers particularly to a galvanometer and ammeter for measuring electrical currents, particularly small alternating currents.

The ammeter now in use for measuring small alternating currents, such as are employed in radio and other work, generally comprises a thermo-couple connected with a galvanometer and a means for heating the thermo-couple from the current to be measured. As ordinarily constructed, this thermo-couple meter has a scale which is not proportional to the current that is being measured. For example, the ordinary thermo-couple meter consists of a heating device or unit which normally is a resistance wire through which the current to be measured is passed, and the thermo-couple which is effected by this heat is normally intimately related to the heating wire, either being soldered to the heating wire, or in other cases the current passes through a part of the thermo-couple itself and does the heating. Associated with the thermo-couple is a sensitive direct current galvanometer through which the voltage generated by the thermo-couple sends a current. The deflection of the galvanometer is proportional to the current flowing through the galvanometer. This current, in turn, is proportional to the temperature of the thermo-couple. Since the power dissipated in the electrical resistance is proportional to the square of the current flowing through the resistance in the thermo-couple meter, the temperature of the thermo-couple is proportional to the square of the current to be measured. The result is that the deflections of the galvanometer of the thermo-couple meter are proportional to the square of the current to be measured. This results in a very irregular scale which is crowded towards the zero end and is unnecessarily great at the other end of the scale. Thus one-half of the current giving full scale deflection produces only one-quarter scale reading and one-fifth of the current producing full scale deflection produces only one-twenty-fifth of full scale deflection in the galvanometer. This nonuniform scale is hard to read and there is a very limited range of currents over which the ammeter gives useful indications.

An object of the present invention is to provide an electrical measuring device including a galvanometer, the deflection of which can be altered from a direct correspondence with the amount of current supplied to the galvanometer, and more specifically an object of the present invention is to provide a form of galvanometer in which the deflection over at least the major portion of the scale of the galvanometer will be substantially proportional to the square root of the current actuating the galvanometer.

More specifically an object of the present invention is to provide a thermo-couple meter including a galvanometer so designed that over the major portion of the scale of the galvanometer the deflection of the galvanometer will be substantially proportional to the current to be measured. It will be seen that by providing a galvanometer the deflection of which is proportional to the square root of the current actuating the galvanometer and combining the same with a thermo-couple which generates heat in accordance with the square of the current to be measured that the deflection of the meter will be substantially proportional to the current being measured.

The present invention, together with further objects and advantages of the same, will be fully understood from the description of a preferred form or example of a measuring instrument embodying the invention. For this purpose, there is hereinafter described the preferred form of galvanometer and thermo-couple meter embodying the invention. The description is given in connection with the accompanying drawings, in which.

Figure 1:
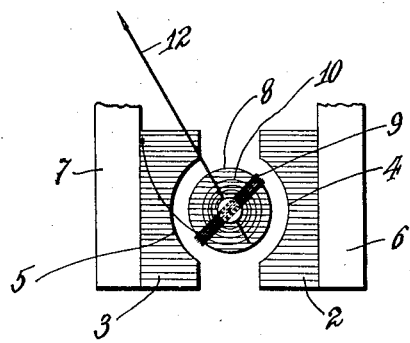
Figure 1 is a diagrammatic view of the normal form of galvanometer.

Referring first to Figure 1 of the drawings, the ordinary galvanometer is normally constructed having the poles 2 and 3 of soft laminated iron, the inner ends of which have circular grooves 4 and 5, respectively. 6 and 7 respectively, indicate the pole tips of a permanent magnet such as may be employed in this form of galvanometer. 8 indicates a stationary soft iron core over which is mounted a moving coil of wire 9 through which the direct current flows which actuates the galvanometer. The coil 9 is, in practice, normally held against rotation by a hair spring 10. 12 indicates a pointer connected with the moving coil 9 to be rotated thereby over a scale upon which the deflection of the galvanometer may be read.

Figure 2:
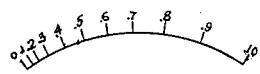
Figure 2 illustrates the scale of such a galvanometer.

It will be observed that in this form of galvanometer the air gap in the magnetic circuit in which the coil 9 rotates is so arranged that the magnetic flux density is uniform throughout the entire air gap. As a result, no matter what the deflection of the coil from its zero position, the force acting on the coil is always proportional to the current flowing through the coil. Accordingly, it will be seen that in the ordinary form of thermo-couple meter since the current flowing through the galvanometer is produced by the thermo-couple and is proportional to the square of the current being measured, the deflection of the galvanometer needle 12 will be proportional to the square of the current to be measured. Figure 2 shows a scale of such a form of galvanometer.

Figure 3:
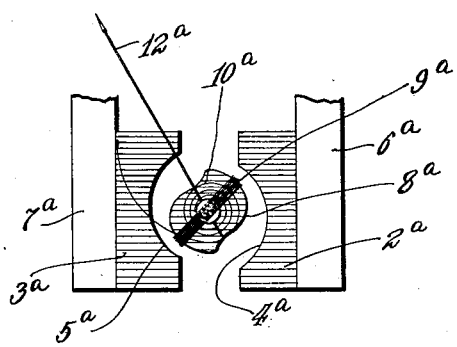
Figure 3 represents one form of galvanometer for the thermo-couple ammeter embodying the present invention.

Now referring to Figure 3 of the drawings, the present invention provides a form of galvanometer in which the deflection of the needle is not proportional to the current flowing through the moving coil. In the drawings, 6$^a$ and 7$^a$ represent the pole tips of a permanent magnet for the galvanometer. 2$^a$ and 3$^a$ represent soft laminated iron pole pieces for the galvanometer. 8$^a$ represents the core of the galvanometer over which is mounted the moving coil winding 9$^a$ through which the current of the galvanometer is to be passed, and 12$^a$ represents the pointer or needle of the galvanometer. The moving coil 9$^a$ is preferably restrained from rotation by suitable means such as the hair spring 10$^a$.

Figure 4:
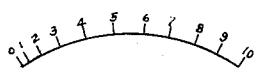
Figure 4 represents a scale which may be used with such a galvanometer.

The poles 2$^a$ and 3$^a$ have their pole faces 4$^a$ and 5$^a$ shaped so that in the zero position of the galvanometer the air gap between the coil 9$^a$ and pole pieces 2$^a$ and 3$^a$ is at a minimum and as the coil 9$^a$ rotates towards the position of full deflection the air gap is progressively increased. As a result of so shaping the core 8$^a$ and the pole faces of the magnets 2$^a$ and 3$^a$ the magnetic flux acting upon the coil 9$^a$ is less for large deflections of the galvanometer than for small deflections of the galvanometer. As a result the deflection of the galvanometer needle 12$^a$ no longer is proportional to the current flowing through the galvanometer. It will be readily seen that by proper shaping of the core 8$^a$ and the pole faces 2$^a$ and 3$^a$ the deflection of the galvanometer needle 12$^a$ may be made proportional to the square root of the current flowing through the coil 9$^a$. From a practical standpoint, shaping of the core 8$^a$ and the pole faces 2$^a$ and 3$^a$ to obtain this ideal condition is difficult but it is readily possible to make a galvanometer in which the shape of the pole faces of the galvanometer is such as to make the deflections of the galvanometer over 90% of the scale substantially proportional to the square root of the current actuating the same. For example, the specific shape of the pole faces and core shown in Figure 3 of the drawings provides a galvanometer which, when combined with a normal thermo-couple member, will produce an ammeter scale such as shown in Figure 4 in which at least 90% of the scale is directly proportional to the current being measured.

While in Figure 3 the galvanometer has its core and its pole faces shaped by cutting the core and the pole faces radially away from the moving coil 9$^a$ in the upper portion of the scale, various modifications of the shape of the pole faces may be made to secure equivalent results. For example, in Figure 5 there is shown a modified form of a pole face. Said figure represents a cross-section through a pole such as 2$^a$ or 3$^a$ of a galvanometer constructed as shown in Figure 1 but with one of the sides 14 of the pole face cut away so as to lessen the width of the pole face in the direction that the rotor of the galvanometer rotates to in assuming the position of full deflection. By decreasing the width of the poles of the galvanometer opposite the position the coil assumes at the point of full deflection the magnetic flux passing through the coil at such point is reduced over that which passes through the coil when it is in the position of zero deflection. Accordingly, as before the deflection of the galvanometer is out of proportion to the current actuating the same, and by properly reducing the width of the poles, the deflection of the galvanometer can be made to correspond with any desired form of scale.

Figure 6:
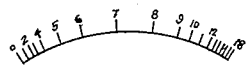
Figure 6 illustrates a scale of a thermo-couple such as may be produced in accordance with the present invention.
Figure 5:
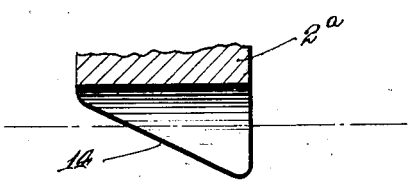
Figure 5 is a modified form of galvanometer embodying the present invention.

While in Figures 3 and 5 the shape of the pole pieces 2$^a$ and 3$^a$ is such as to cause a progressive decrease in the amount of magnetic flux passing through the coil winding 9$^a$ as it rotates to the maximum position, the present invention also includes changes in the shape of the core and the pole pieces of the galvanometer by which the deflection of the galvanometer, in accordance with the current actuating the same, is caused to deviate from a direct proportion in various other manners. For example, by cutting the poles faces $2^a$ and $3^a$ so that at both extremes of the scale the air gaps are at a maximum or the areas of the pole faces adjacent the winding of the rotor are at a minimum and providing a construction of the pole pieces so that in the center portion of the scale the coil of the galvanometer is opposite a point where the air gap is at a minimum or where the area of the pole faces is at a minimum, the scale of the thermo-couple galvanometer may be caused to assume the form shown in Figure 6 wherein it will be observed that the center portion of the scale is greatly magnified while both extremes of the scale are greatly reduced. This form of an ammeter is of value in industrial work where accurate temperature control is desired. By constructing the thermo-couple meter so that at the desired temperature of operation the deflection of the meter would be in the middle of the scale shown in Figure 6, the temperature can be accurately read.

While in Figure 3 of the invention I have shown a means for varying the air gap between the core and pole faces of the galvanometer by cutting both the core and pole faces in other than their usual cylindrical shape, it is understood that the invention may be carried out by leaving either of these parts circular and cutting either of the other parts into the desired shape so as to obtain the varying air gap throughout the position in which the rotor $9^a$ revolves. Furthermore, the core can be shaped so that at the zero position of the pointer the clearance between the coil and core is a normal amount for the entire axial length of the coil and core but as the coil rotates, by shaping the core, it can be made to include in its flux path less of the axial length of the core so that the normal clearance distance between the coil and core becomes progressively less and less.

Figure 7:
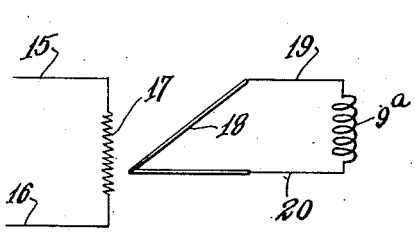
Figure 7 represents an electrical diagram showing one form of connecting a galvanometer with a thermo-couple to produce a thermo-couple meter embodying the present invention.

While I have not shown in Figures 1, 3 or 5 any specific form of thermo-couple for actuating the galvanometers, it is understood that any usual or preferred form of thermo-couple for actuating the galvanometer may be employed. In Figure 7 the electrical diagram illustrates the connections between such a thermo-couple unit and a galvanometer. In Figure 7, 15 and 16 indicate the leads from the current circuit which is to be measured. Said leads connect with a resistance 17 which is shown disposed adjacent one terminal of the thermo-couple 18. 19 and 20 indicate leads from said thermo-couple connecting with the coil $9^a$ which is the rotor coil of the galvanometer heretofore specifically described.

While the particular form of measuring apparatus herein described is well adapted for carrying out the objects of the invention, it is to be understood that various modifications and changes may be made in the invention without departing from the spirit of the invention, and the invention includes all such modifications and changes as come within the scope of the following appended claims.

I claim:

1. A galvanometer comprising, pole pieces, a rotor coil mounted to rotate between the pole pieces and carrying a needle, said pole pieces being shaped to effect a change in the magnetic flux passing through the rotor coil as the same rotates from the position of zero deflection to full deflection whereby the deflection of the needle increases in proportion to the square root of the current applied to the galvanometer.

2. A galvanometer comprising, pole pieces, a rotor coil mounted to rotate between the pole pieces, and a needle connected with said rotor coil, said pole pieces being shaped to change the amount of magnetic flux flowing through the rotor coil in its different positions whereby throughout the major part of its rotation said rotor coil will give deflections substantially proportional to the square root of the current actuating the same.

3. A galvanometer comprising pole pieces, a rotor coil mounted to rotate between the pole pieces and carrying an indicating needle, said pole pieces and the core of the rotor being so relatively proportioned in shape as to effect a change in the magnetic flux passing through the rotor coil as it rotates from the position of zero deflection to full deflection, whereby the deflection of the needle increases in proportion to the square root of the current applied to the galvanometer over a substantial portion of the deflecting range of said needle.

Signed at California, this 1st day of February, 1928.

FREDERICK EMMONS TERMAN.